United States Patent Office 3,122,553
Patented Feb. 25, 1964

3,122,553
4-ALKYL RESORCINOLATES OF AMINO-ACRIDINES
Harry Seneca, Fort Lee, N.J., assignor to Bansen, Inc., New York, N.Y., a corporation of New York
No Drawing. Filed Aug. 20, 1959, Ser. No. 834,923
9 Claims. (Cl. 260—279)

This invention relates to novel therapeutic compositions and to a process for their preparation. More particularly, the present invention relates to therapeutic salts of 4-alkyl resorcinols with aminoacridines.

I have discovered new therapeutic substances which are active pathogenicidal agents, that is, chemotherapeutically active fungicidal, bactericidal and trichomonicidal agents which are also useful as anthelmintics and in the elimination of other endoparasites, e.g., amoebic infestations. In addition, the salts of my invention are valuable spermaticidal compositions.

The therapeutic products of the present invention are 4-alkyl resorcinol salts of aminoacridines having antimicrobial activity, of which the resorcinol moiety is represented graphically as follows:

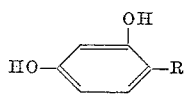

while the acridine moiety has the following structure, the numbering system employed in the present application being also indicated:

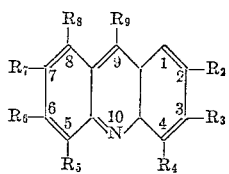

In the structural formulae above recited, R is an alkyl radical, and preferably one containing from 2 to 10 carbon atoms, and most desirably in the range of 6 to 8 carbon atoms; while $R_5$ and $R_9$ are H or $NH_2$; each of $R_2$, $R_3$, $R_6$, $R_7$, and $R_8$ is alkoxy, preferably wherein the alkyl component contains from 1 to 4 carbon atoms, or an amino or hydrogen radical, $R_6$ being capable of being also halogen, preferably chlorine or bromine, when $R_2$ and $R_3$ are hydrogen or amino; while $R_4$ is hydrogen or an alkyl group of 1 to 4 carbon atoms; at least one but no more than two of $R_2$, $R_3$, $R_5$, $R_6$, $R_7$, $R_8$, and $R_9$ being an amino substituent, and no more than one of $R_2$ and $R_3$ and no more than one of $R_6$, $R_7$, and $R_8$, being an alkoxy radical.

The acridine compound used in the preparation of the therapeutic substances of the present invention can be reacted with a 4-alkyl resorcinol as described herein, either as the free amine or as a salt thereof having e.g., a monovalent anionic acid residue capable of being replaced by a 4-alkyl resorcinol.

Highly satisfactory salts of the present invention are 9-aminoacridine-4-hexyl resorcinolate and
9-aminoacridine-4-octyl resorcinolate.

Illustrative of other desirable therapeutically active salts are:

2,5-diamino-7-ethoxyacridine-4-hexyl resorcinolate,
3,6-diaminoacridine-4-hexyl resorcinolate,
6,9-diamino-2-ethoxyacridine-4-hexyl resorcinolate,
6-chloro-9-aminoacridine-4-hexyl resorcinolate,
6-chloro-9-aminoacridine-4-octyl resorcinolate,
6-aminoacridine-4-hexyl resorcinolate,
6-aminoacridine-4-octyl resorcinolate,
6,9-diaminoacridine-4-hexyl resorcinolate,
6,9-diaminoacridine-4-octyl resorcinolate,
3,8-diaminoacridine-4-hexyl resorcinolate,
3,8-diamino-acridine-4-octyl resorcinolate,
3,7-diaminoacridine-4-hexyl resorcinolate,
3,7-diaminoacridine-4-octyl resorcinolate,
3,6-diaminoacridine-4-hexyl resorcinolate,
3,6-diaminoacridine-4-octyl resorcinolate,
2,7-diaminoacridine-4-hexyl resorcinolate,
2,7-diaminoacridine-4-octyl resorcinolate,
3,9-diamino-7-ethoxyacridine 4-octyl resorcinolate, and
6,9-diamino-2-ethoxyacridine 4-octyl resorcinolate.

These novel therapeutic compounds can be prepared by reaction of the free phenol (4-alkyl resorcinol) with the free base (the amino-acridine) in a suitable water-miscible organic solvent, for example, methanol, ethanol, butanol, or other alkanol, dimethyl sulfoxide, dimethyl formamide, dimethyl acetamide, and the like. It is of advantage to employ a solvent in which the product is substantially insoluble, i.e., in which it has a solubility no greater than 1 mg. per ml. of solvent, or from which it can be precipitated on the addition of water. The preferred mode of preparation, however, comprises reacting metal (including ammonium) salts of the phenol with acid salts of the aminoacridines in water.

Illustrative of the free acridines which can be employed in the preparation of the compounds of the present invention are 9-aminoacridine, 2,5-diamino-7-ethoxyacridine, 6,9-diamino-2-ethoxyacridine, 6-chloro-9-aminoacridine, 3,6-diaminoacridine, 3,8-diaminoacridine, 3,7-diaminoacridine, 3,9-diaminoacridine and 2,7-diaminoacridine as well as other antimicrobially active aminoacridines and chloro-, bromo-, and lower alkoxy aminoacridines.

Suitable reactant salts of substituted acridines for preparation of the products of my invention are, by way of illustration, the inorganic acid halides, as well as the corresponding sulfates, phosphates, nitrates, and the like, and organic acid salts such as the carboxylic acid salts, for example, lactate, acetate and the like; and including 3,8-diaminoacridine sulfate monohydrate,
9-aminoacridine monohydrochloride,
6,9-diaminoacridine hydrochloride monohydrate,
3,9-diamino-7-ethoxyacridine lactate,
3,6-diaminoacridine hydrochloride,
9-aminoacridine hydrobromide,
2,7-diaminoacridine phosphate and
5-aminoacridine nitrate.

Illustrative of the reactant salts of alkyl resorcinols for use herein are inorganic salts such as the alkali metal salts, e.g., potassium 4-hexyl resorcinolate, sodium-4-octyl resorcinolate, potassium-4-octyl resorcinolate, and sodium-4-hexyl resorcinolate; and also ammonium 4-hexyl resorcinolate and ammonium-4-octyl resorcinolate.

The acridine and resorcinol compounds are preferably reacted in equimolecular proportions and combine in this same proportionate relationship.

The salts of the present invention have been found to be highly active against a large variety of organisms and to exhibit a potency which is greater than the sum of the activities of the component substances. Thus, 9-aminoacridine 4-hexyl-resorcinolate inhibits the growth of all the organisms usually employed in antibacterial screen tests, including Pseudomonas aeruginosa, at a dilution of 1:20,000 and higher, as shown by the following table:

TABLE I

Bacteriostatic Action of 9-Aminoacridine 4-Hexyl-Resorcinolate Against a Spectrum of Bacteria, Candida, Trichophyton, and Trichomonas

| | |
|---|---|
| Candida albicans | [1] 1:20,000 |
| Mycobacterium smegmatis | 1:40,000 |
| Bacillus subtilis | 1:20,000 |
| Pseudomonas aeruginosa | 1:20,000 |
| Staphylococcus aureus | 1:20,000 |
| Escherichia coli | 1:20,000 |
| Trichophyton mentagraphytes | 1:400,000 |
| Trichomonas vaginalis | 1:256,000 |
| Trichomonas foetus | 1:64,000 |

[1] Tests conducted in 5% serum agar. Figures shown indicate dilution inhibiting growth.

The salts of the present invention are effective also against other bacteria and fungi, including B. proteus, S. typhi, A. aerogenes, S. boydii, Enterococcus, M. pyogenes aureus, S. pyogenes, C203M, T. rubrum, H. capsulatum, M. audouini, P. pedrosi, B. dermatitides, C. neoformans, C. immitis, Endameba histolytica, Trypanosoma cruzi, and Leishmania donovani.

The new salts have been found also to be non-irritating at active dilutions, and to be lacking in sensitizing potential. Thus, a 1:1,000 dilution of 9-aminoacridine 4-hexyl resorcinolate is non-irritating to the rabbit eye. No sign of irritation was observed when a 1:500 solution of the salt in 13% dimethyl acetamide was applied to the shaved, abraded dorsal area of guinea pigs.

Concentrations of 1:500 and 1:1000 were injected intracutaneously into guinea pigs in 0.1 ml. amounts five days per week for two weeks. After a two week rest period, re-test injections were made. Observations made 24 hours after the re-test injections showed no erythema. The compound according to this test does not produce sensitization.

Because of their broad spectrum activity, the salts are suitable for use in place of various antibiotics, such as neomycin, in conjunction with other therapeutic agents, such as corticosteroids, and also alone as general antiseptics for internal and external use.

The nature of the products of my invention as definite chemical compounds (organic salts) has been established in several ways. The curve obtained in a standard fusion, temperature-composition test indicated definitely that a compound is formed of equimolar proportions of the two compounds (the aminoacridine and the 4-alkyl resorcinol). This is confirmed by the uniformly high yield of about 95% obtained by the metathetical reactions by which the salts are preferably formed, and by the constancy of the melting points, even when different ratios of the reactants are employed. Also, a mixture of equal parts of the reactants behaved very differently from the corresponding salt produced by the process of the invention on rise of the temperature to the respective melting points. Infrared analysis gave a spectrum different from that of the constituent substances and not a composite of the individual spectra of the two compounds, and gave strong evidence that the salt formation occurs on the amino nitrogen.

The reaction proceeds at room temperature, and temperatures in the range of 20° C. to 80° C. are normally employed, the preferred reaction temperature being about 40° C. The reaction is normally complete after about twenty minutes at the higher temperatures. Optionally, to effect ultimate purification, the product prepared as described herein can be introduced into a water-miscible solvent medium, such as dimethylacetamide or dimethylformamide, with subsequent precipitation therefrom with water.

The following examples illustrate in greater detail the preparation of the products of my invention but are not intended to indicate the scope thereof.

EXAMPLE 1

4-hexylresorcinol (194 grams) is added to a solution composed of 56.1 grams of potassium hydroxide in 1.5 liters of water with stirring, and the mixture heated to about 40° C. to effect complete solution. The pH of this solution is 12.

A second solution of 9-aminoacridine hydrochloride is prepared as follows:

Two liters of water containing 83 ml. of concentrated hydrochloric acid are heated with stirring to about 80° C. Slowly 194 grams of 9-aminoacridine are added. Heating is continued until a clear solution is obtained. About 2 ml. of additional concentrated hydrochloric acid are added in small increments until the solution is slightly acid (pH of about 6).

The 4-hexyl resorcinol solution is now slowly added under rapid agitation to the 9-aminoacridine hydrochloride solution. A copious precipitate is formed which, upon stirring and continued addition of the 4-hexyl resorcinol solution, becomes a creamy yellow slurry. At the end of the addition, the pH is found on indicator paper to be between 7 and 8. The slurry is stirred while heated for an additional 15 minutes and then rapidly filtered on a 15 cm. Buchner funnel.

The product thus obtained is washed thoroughly, using about one liter of cold water, to give a very pale yellow color in the last wash. The compound is then pressed dry and then oven-dried for two to three hours at 50° C. The resultant product, 9-aminoacridine 4-hexyl resorcinolate, has a melting point of 189° C.–190° C.

EXAMPLE 2

To a hot solution of 46 g. (.2 M) of 9-aminoacridine hydrochloride in 400 ml. of water on a steam bath at a temperature of about 40° C. there is added slowly a solution of 44.5 g. (0.2 M) of octyl resorcinol in 200 ml. of water containing 11.5 g. (0.205 M) of potassium hydroxide. A yellow precipitate is formed and vigorous stirring continued for 20 minutes which results in the production of a yellow slurry. The resultant mixture is filtered, washed with cold water and dried in a draft oven at 50° C. to constant weight to yield 81.5 g. of 9-aminoacridine 4-octyl resorcinolate, which begins to soften at 155° C. and melts with decomposition at 168° C.–170° C.

EXAMPLE 3

To twelve hundred milliliters of water are added 115.2 g. (0.5 M) of 9-aminoacridine hydrochloride and the mixture stirred and heated at about 40° C. until complete solution occurs. To this stirred solution are added slowly a solution of 28 g. (0.5 M) of potassium hydroxide in 750 ml. of water and 97 g. (0.5 M) of 4-hexylresorcinol. The yellow precipitate which is formed immediately is stirred vigorously on the steam bath for an additional 15 minutes, and is then filtered through a Buchner funnel, washed with 500 ml. of cold water and dried for several hours in a draft oven at 50° C. A bright orange solid, 9-aminoacridine 4-hexyl resorcinolate, results; weight 171.6 g., M.P. 189° C.–190° C.; orange yellow.

EXAMPLE 4

To 2400 ml. of water is added one mole of 6,9-diaminoacridine hydrochloride and the resultant mixture is stirred and heated at about 40° C. until the acridine is dissolved. To this stirred solution is added, slowly, a further solution containing 1 mole of potassium hydroxide, 1500 ml. of water and 1 mole (97 grams) of 4-hexyl resorcinol. The dark brown precipitate which is formed is stirred vigorously on a steam bath for an additional 15 minutes, filtered through a Buchner funnel, washed with 1000 ml. cold water and permitted to dry in a draft oven at 50° C. for a period of several hours. A dark brown amorphous solid, 6,9-diaminoacridine 4-hexyl resorcinolate having a melting point of 108° C.–110° C. which decomposes at 118° C., is obtained.

EXAMPLE 5

One mole of 6,9-diamino-2-ethoxyacridine sulfate monohydrate is added to 2400 ml. of water and the resulting mixture heated to a temperature of approximately 40° C. until solution occurs. To this solution is added slowly with stirring a further solution of 1 mole (56 grams) of potassium hydroxide in 1500 ml. of water and 1 mole (194 grams) of 4-hexylresorcinol. The yellow precipitate which is formed is stirred vigorously on the steam bath for an additional 15 minutes, filtered through a Buchner funnel, washed with 1000 ml. of water and dried for several hours in a draft oven at 50° C. A bright yellow solid, 6,9-diamino-2-ethoxyacridine-4-hexyl resorcinolate having a melting point of 155° C. to 156° C. (decomposition) is obtained.

EXAMPLE 6

One mole of 6,9-diaminoacridine nitrate is added to 2400 ml. of water and the resulting mixture heated to a temperature of approximately 40° C. until solution occurs. To this solution is added slowly with stirring a further solution of 1 mole of ammonium hydroxide in 1500 ml. of water and 1 mole of 4-ethyl resorcinol. The precipitate which is formed is stirred vigorously on the steam bath for an additional 15 minutes, filtered through a Buchner funnel, washed with 1000 ml. of water and dried in a draft oven at 50° C. 6,9-diaminoacridine-4-ethyl resorcinolate is obtained.

EXAMPLE 7

One mole of 3,7-diaminoacridine is dissolved in 750 cc. of dimethyl acetamide at about 40° C., and to this solution there is added slowly with stirring a solution of 1 mole of 4-hexyl resorcinol in 500 cc. of the same solvent. After stirring for ten minutes there are added about four liters of water and the precipitate which is formed is stirred for an additional 15 minutes, filtered through a Buchner funnel, washed with 1000 ml. of water and dried in a draft oven at 50° C. The product is 3,7-diaminoacridine 4-hexyl resorcinolate.

EXAMPLE 8

One mole of 9-amino-4-methyl acridine hydrochloride is dissolved in 2500 ml. of water at about 50° C. and there is then added slowly a solution of one mole of the sodium salt of 4-hexyl resorcinol in 1500 ml. of water. The formed precipitate is stirred on the steam bath for about 15 minutes, is filtered through a Buchner funnel, washed with 1 liter of cold water and then dried in air at 50° C. for a number of hours. The product is the 4-hexyl resorcinolate of 9-amino-4-methyl acridine.

In similar fashion, either by reacting a salt of the aminoacridine with a salt of the resorcinol in water, or by reacting the free aminoacridine base with the free phenol in a water miscible organic solvent, followed by the addition of water to precipitate the resorcinolate, there can be obtained the other compounds of the invention such as 3,8-diaminoacridine 4-hexyl resorcinolate, 3,6-diaminoacridine 4-hexyl resorcinolate, 2,7-diaminoacridine 4-hexyl resorcinolate, 2,6-dimethoxy-9-aminoacridine 4-octyl resorcinolate, 6-chloro-9-aminoacridine 4-octyl resorcinolate, etc.

The 4-octyl resorcinol may be the n-octyl compound but is preferably a branched alkyl group, like diisobutyl but preferably is 1,1,3,3-tetramethyl butyl, prepared from di-isobutylene, and having the following structure:

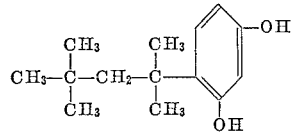

The novel salts of my invention can be administered orally in the form of tablets, capsules, elixirs and the like in admixture with a suitable pharmaceutical carrier; parenterally in the form of suspensions, solutions and the like, preferably intravenously, although intramuscular and subcutaneous routes are also operative; and topically in the form of ointments, creams, suppositories, sprays and the like. For topical use, polyethylene glycol is the preferred medicinal carrier, although 50% ethanol or an aqueous system can also be employed. The pharmaceutical carrier should be buffered to a pH of 5.7 or below. Depending upon the specific disease treated, the route of administration and the therapeutic dosage will vary from about 1 mg. to 350 mg. per day. Administration is desirably in proportionate divided dosages.

The novel medicaments of the present invention are illustrated by the following examples:

*Preparation A*

TABLET

| | Mg. |
|---|---|
| 9-aminoacridine 4-hexyl resorcinolate | 125 |
| Lactose | 175 |
| Corn starch | 120 |
| Gelatin | 20 |
| Magnesium stearate | 2 |

The weighed amounts of lactose, starch and gelatin are granulated with water. The granulation is dried in a steam-heated oven at about 60° C. to 75° C. and then reduced to proper particle size by passage through a 16 mesh screen. To this granulation is added the finely divided 9-aminoacridine 4-hexyl resorcinolate and magnesium stearate and the mixture stirred until uniform dispersion is effected. The mixture is then formed into tablets by introduction thereof into a tabletting mold followed by compression.

*Preparation B*

DUSTING POWDER FOR TOPICAL APPLICATION

| | | |
|---|---|---|
| 9-aminoacridine 4-hexyl resorcinolate | mg | 2 |
| Talcum | gr | 1 |

These ingredients are mixed until uniform.

*Preparation C*

INJECTIBLE SOLUTION

| | | |
|---|---|---|
| 9-aminoacridine 4-octyl resorcinolate | mg./ml | 1 |
| Water for injection | cc | 1 |

The aforesaid ingredients are mixed and heated to a temperature of about 40° C. until solution is effected and then filtered through a bacterial filter and filled into amber ampules under aseptic conditions.

*Preparation D*

TOPICAL SPRAY

| | | |
|---|---|---|
| 9-aminoacridine 4-octyl resorcinolate | mg | 10 |
| Isopropyl myristate | mg | 4.99 |
| Propellant (65% [1] of trifluorochloromethane and 35% of difluorodichloromethane) | gm | 150 |

[1] Percentage by weight.

A slurry is formed of the 9-aminoacridine 4-octyl resorcinolate and isopropyl myristate and the mixture is then measured into an aerosol container and the trifluorochloromethane and difluorodichloromethane then charged thereinto.

Preparation E

OTIC SOLUTION

| | Mg. |
|---|---|
| 6,9-diaminoacridine 4-octyl resorcinolate | 2 |
| Propylene glycol | 1.0 |

The above recited ingredients are brought together to form a mixture which is then heated at a temperature of about 40° C. until solution occurs. The solution is then passed through a bacterial filter. Passage through the filter is optional since the acridine-resorcinol salt is essentially self-sterilizing.

Preparation F

OPHTHALMIC SOLUTION

| | | |
|---|---|---|
| 3,8-diaminoacridine 4-hexyl resorcinolate | mg./ml | 1 |
| Poly (oxygenated tert. octyl phenol-formaldehyde) (Superimore) | mg./ml | 100 |
| Water | cc | 1 |

The above-listed ingredients are brought together to form a mixture. This mixture is then heated at a temperature of about 40° C. until solution occurs. This solution is then passed through a bacterial filter and recovered.

Preparation G

OPHTHALMIC SOLUTION

| | | |
|---|---|---|
| 3,8-diaminoacridine 4-octyl resorcinolate | mg./ml | 1 |
| Prednisolone | mg./ml | 2 |
| Poly (oxyethylated tert. octyl phenol-formaldehyde) (Superimore) | mg./ml | 100 |
| Water | cc | 1 |

The above-listed ingredients, other than the prednisolone, are brought together and the mixture is then heated at a temperature of about 40° C. until solution occurs. The prednisolone is then introduced into the solution and the mixture stirred to form a uniform suspension, which is passed through a bacterial filter and recovered.

Preparation H

NASAL SPRAY

| | Mg. |
|---|---|
| 3,7-diaminoacridine 4-hexyl resorcinolate | 2 |
| Phenylephrine | 2.5 |
| Sorbitol, N.F. | 50 |

A mixture of the above listed ingredients is formed and heated at about 40° C. to effect solution thereof. The resultant solution is then allowed to cool.

Preparation I

NASAL SPRAY

| | Mg. |
|---|---|
| 3,6-diaminoacridine 4-octyl resorcinolate | 2 |
| Phenylephrine | 2.5 |
| Sorbitol, N.F. | 50 |
| 3 - (2 - pyridyl) - 3 - p - chlorophenyl - N,N - dimethyl-propylamine maleate (Chlortrimeton maleate) | 3 |

These ingredients are compounded as described in Preparation H.

Preparation J

TOPICAL CREAM

| | | |
|---|---|---|
| 2,7-diaminoacridine 4-octyl resorcinolate | mg./gm | 2 |
| Petrolatum, USP | gm | 1 |

These ingredients are mixed until a uniform cream is obtained.

Preparation K

TOPICAL CREAM

| | |
|---|---|
| 9-aminoacridine 4-octyl resorcinolate | 2 mg./gm. |
| Polyethylene glycol (40/60) | Sufficient to make up to 1 gram. |

These ingredients are mixed to uniformity.

Preparation L

SUPPOSITORY

| | |
|---|---|
| 9-aminoacridine 4-hexyl resorcinolate | 10 mg. |
| Cocoa butter | Sufficient to make a total of ingredients of 4 gm. |

The cocoa butter is liquefied by heating and 9-aminoacridine-4-hexyl resorcinolate mixed therein. The resultant suspension is then introduced into a chilled suppository mold, removed and enfolded in waxed paper or metal foil.

Preparation M

TOPICAL CREAM

| | | |
|---|---|---|
| 6,9-diamino-2-ethoxy acridine 4-hexyl resorcinolate | mg./gm | 2 |
| Petrolatum USP | gm | 1 |

These ingredients are mixed to uniformity.

I claim:
1. 9-aminoacridine 4-hexyl resorcinolate.
2. 9-aminoacridine 4-octyl resorcinolate.
3. 9-aminoacridine 4-(1,1,3,3-tetramethylbutyl)resorcinolate.
4. 6,9-diaminoacridine 4-hexyl resorcinolate.
5. 6,9-diamino-2-ethoxyacridine 4-hexyl resorcinolate.
6. 3,8-diaminoacridine 4-hexyl resorcinolate.
7. 3,7-diaminoacridine 4-hexyl resorcinolate.
8. 3,6-diaminoacridine 4-hexyl resorcinolate.
9. 2,7-diaminoacridine-4-hexyl resorcinolate.

References Cited in the file of this patent

UNITED STATES PATENTS 2,092,131    Mietzsch    Sept. 7, 1937

OTHER REFERENCES

Labes et al.: Chem. Abstracts, vol. 34, col. 4069 (1940).

Albert: Sci. Progress, pp. 419 and 425, vol. 37 (1949).

Rodrigues da Costa: Chem. Abstracts, vol. 51, pp. 12317 (1957), citing Rev. espec. Saude publica, vol. 8 pp. 257-269 (1955).

Viscia et al.: Journal American Pharmaceutical Association, pp. 52-54, vol. 43, (1954).

Fukamauchi et al.: Journal Pharmaceutical Society of Japan, pp. 1172-74, vol. 76 (1956).